(12) United States Patent
Weber

(10) Patent No.: US 8,373,296 B1
(45) Date of Patent: Feb. 12, 2013

(54) INTEGRATED LUNAR TIDE ELECTRIC GENERATOR AND FLOATING RETAIL STRUCTURES SYSTEM

(76) Inventor: James Walter Weber, Plano, TX (US)

(*) Notice: Subject to any disclaimer, the term of this patent is extended or adjusted under 35 U.S.C. 154(b) by 319 days.

(21) Appl. No.: 12/818,765

(22) Filed: Jun. 18, 2010

Related U.S. Application Data

(60) Provisional application No. 61/269,108, filed on Jun. 22, 2009.

(51) Int. Cl.
*F03B 13/10* (2006.01)
*F03B 13/12* (2006.01)
*H02P 9/04* (2006.01)

(52) U.S. Cl. .......................... 290/53; 290/42
(58) Field of Classification Search .......... 290/53, 290/42; 60/497
See application file for complete search history.

(56) References Cited

U.S. PATENT DOCUMENTS

| | | | |
|---|---|---|---|
| 3,959,663 A * | 5/1976 | Rusby | 290/53 |
| 4,599,858 A * | 7/1986 | La Stella et al. | 60/497 |
| 5,009,568 A * | 4/1991 | Bell | 415/3.1 |
| 6,967,413 B2 | 11/2005 | Atiya | |
| 7,075,190 B1 | 7/2006 | Lomerson, Sr. et al. | |
| 7,199,483 B2 | 4/2007 | Lomerson, Sr. et al. | |
| 7,434,396 B2 | 10/2008 | McGahee | |
| 7,492,054 B2 | 2/2009 | Catlin | |
| 7,525,214 B2 | 4/2009 | Atilano Medina et al. | |
| 7,564,143 B1 | 7/2009 | Weber | |
| 7,584,609 B2 | 9/2009 | Welch, Jr. et al. | |
| 7,602,076 B1 | 10/2009 | Sipp | |
| 7,615,970 B1 | 11/2009 | Gimlan | |
| 7,650,749 B2 | 1/2010 | Borgesen | |
| 7,690,900 B2 | 4/2010 | Sieber | |
| 7,759,814 B2 * | 7/2010 | Oigarden | 290/53 |
| 7,768,143 B2 * | 8/2010 | McCague et al. | 290/42 |
| 7,791,213 B2 * | 9/2010 | Patterson | 290/53 |
| 8,102,065 B2 * | 1/2012 | Hobdy | 290/1 R |
| 2006/0028026 A1 * | 2/2006 | Yim | 290/53 |

OTHER PUBLICATIONS

"Energy Resources: Tidal power"; Jan. 11, 2010; http://www.darvill.clara.net/altenerg/tidal.htm.
"Energy Resources: Wave power"; Jan. 29, 2010; http://www.darvill.clara.net/altenerg/wave.htm.
Siemens; "Sgen-100A-4P series"; Siemens Power Generation—Electrical Generator Provider; Siemens AG 2007; http://www.powergeneration.siemens.com/products-solutions-services/...ators/small-scale-250mva/sgen-100a-4p-series/sgen__1004__4pseries.htm.
Cummins; "AvK"; Cummins Generator Technologies Produck AvK; Cummins Generator Technologies 2006; http: / /www.cumminsgeneratortechnolog ies.com/en/ products/avk/.
Cummins; "DIG Generators"; Cummins Generator Technologies Products AvK DIG Generators; Cummins Gnerator Technologies 2006; http://lm,vwcumminsgeneratortechnologies,com/en/products/avk/diggenerators/#top.

* cited by examiner

*Primary Examiner* — Hae Moon Hyeon
(74) *Attorney, Agent, or Firm* — Carr LLP

(57) ABSTRACT

A system for converting the tidal variations of water to electrical energy. The system has a stabilizing column, a platform configured to float at least partially above the water surface moving relative to the at least one stabilizing column, and an electrical generating system configured to transform the movement of the platform relative to the at least one stabilizing column into electrical energy. The platform can have a top side and floating retail structures and can be configured for constructional development.

13 Claims, 2 Drawing Sheets

INTEGRATED LUNAR TIDE ELECTRIC GENERATOR AND FLOATING RETAIL STRUCTURES SYSTEM

CROSS-REFERENCED APPLICATIONS

This application relates to, and claims the benefit of the filing date of, co-pending U.S. provisional patent application Ser. No. 61/269,108 entitled INTEGRATED LUNAR TIDE ELECTRIC GENERATOR AND RETAIL SYSTEM, filed Jun. 22, 2009, the entire contents of which are incorporated herein by reference for all purposes.

BACKGROUND OF THE INVENTION

1. Field of the Invention

The present invention relates to tidal energy and, more particularly, to a floating generator system with retail structures thereon, converting changes in water levels due to lunar tides to electrical energy.

2. Description of the Related Art

It is known to generate electricity by using various fuels and sources of power, including fossil fuels, nuclear fuel, solar energy and wind power.

Burning fossil fuels in electrical power plants to generate electricity is well-known, and provide a reliable and consistent source of power, but burning fossil fuels is undesirable because it is not a renewable resource, has a high cost, and results in political instabilities and creation of air and water pollution. Additionally, the burning of fossil fuels can produce large amounts of pollution, such as carbon dioxide, which can contribute to the greenhouse effect. The extraction and accidental release of fossil fuels can destroy the surrounding natural habitat. Nuclear power can provide a consistent electric power, but also has multiple disadvantages. One disadvantage is the associated nuclear waste, which is very hazardous. Additionally, the fuel for nuclear energy, uranium, is not renewable. While solar and wind power do not produce large amounts of pollution, the power generated is often not consistent and depends largely on the weather conditions.

Tidal energy can produce electricity consistently and produces little to no pollution. However, current methods of producing tidal energy, such as tidal barrages and the like, interrupt the inland water levels and can lead to the disruption of fish migration and nearby wildlife. Because locations for tidal barrages are often dictated by the presence of specific geographical features, an appropriate location for a tidal barrage might be in an area with very little electrical demand. Building an extensive electrical transmission system is expensive. Additionally, the structures generally used in known tidal energy methods are often not multifunctional.

SUMMARY OF THE INVENTION

In accordance with an embodiment of the invention, an integrated lunar tide electric generator and floating retail structures system comprising at least one stabilizing column having a first end secured to an underwater surface and a second end extending away from a water surface; a platform, configured to float at least partially above the water surface and having retail structures thereon; the platform coupled to the at least one stabilizing column, the platform configured to change its position relative to the at least one stabilizing column in response to tidal variations; an electric generating system attached to the platform, the electrical generating system configured to convert changes of position of the platform in relation to the at least one stabilizing column to electrical energy; and a connector configured to couple the electrical generating system with the at least one stabilizing column.

In accordance with another embodiment of the invention, an integrated lunar tide electric generator and floating retail structures system comprising at least one stabilizing column having a first end secured to an underwater surface and a second end extending away from a water surface; a rack gear attached to the at least one stabilizing column; a platform, configured to float at least partially above the water surface and having retail structures thereon, wherein the platform is coupled to the at least one stabilizing column, the platform configured to change its position relative to the at least one stabilizing column in response to tidal variations; an electric generating system attached to the platform; a series of reduction gears coupling the rack gear and the electrical generating system; and wherein the movement of the platform in response to the tidal variations actuates the reduction gears to convert the movement of the platform into electrical energy.

As opposed to such power sources as wind, solar, nuclear and fossil fuels, the lunar tides, for a given location, provide a predictable, consistent and endless supply of power with little to no pollution. The present invention can convert the vertical change in water levels due to lunar tides, referred to as tidal variations, into electrical energy without depending on a tidal barrage; therefore, the inland water levels will not be affected and local wildlife and fish migration will not be disrupted. While current tidal energy structures are generally not multifunctional, the present invention can provide usable space to develop into retail, commercial or residential spaces and the like, referred to as constructional development. The electricity produced can be directed into the electric power grid being utilized by the local electric utilities or directed to the electrical demand created by the constructional development of the invention. In addition, the constructional development would provide for additional revenue because any retail spaces and the like could be rented or leased. Another aspect of the invention that is believed to be unique is the ability to retrofit existing floating structures that were built for another purpose, such as to be floating docks, marinas, or the like, to become an integrated lunar tide electric generator and floating retail structures system while not disturbing the original purpose of the floating structure.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, generally details concerning well known features and elements have been omitted inasmuch as such details are not considered necessary to obtain a complete understanding of the present invention, and are considered to be within the understanding of persons of ordinary skill in the relevant art.

Figure 1:
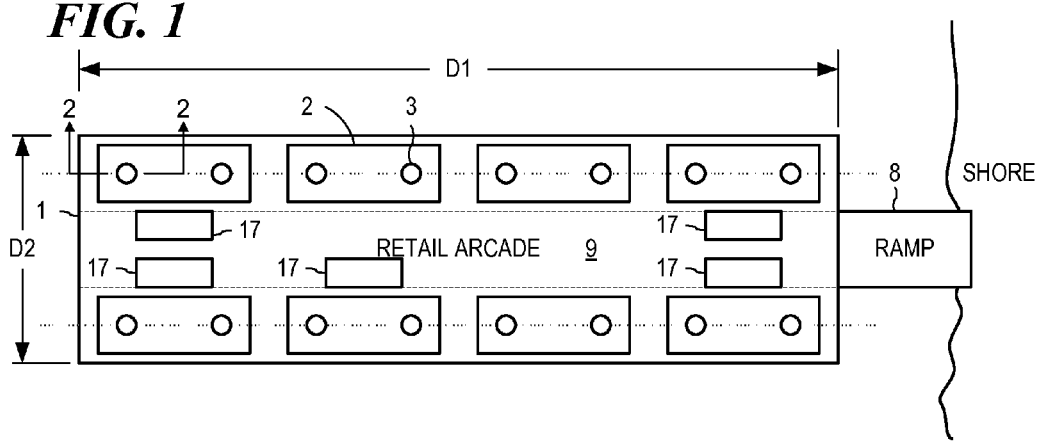
FIG. 1 illustrates a top view of the Integrated Lunar Tide Electric Generator and Floating Retail Structure System.

Turning now to the drawings, FIG. 1 shows a top view of one embodiment of the integrated lunar tide electric generator and floating retail structures system, indicating an area on a top side of the platform 1 that can be used for constructional development, such as retail arcade space, residential units, and the like. As shown in FIG. 1, and in the preferred embodiment, there are 16 stabilizing columns 3, which are secured to an underwater surface such as the sea bed.

In one embodiment of the invention, the at least one stabilizing column 3 can be a cylinder fabricated from formed and welded metal plates. The preferable metal is galvanized steel or a similar corrosion resistant material. The hollow cylinder, having a galvanized steel perimeter, can then be secured into the sea floor, such as by being driven to refusal. The hollow cylinder can then be filled with concrete, or as available or economical, site excavation debris. The additional weight from the concrete or excavation debris can provide lateral stability to the at least one stabilizing column 3 in reaction to tidal variations and water currents. Additionally, a metal cap, preferably galvanized steel or a similar corrosion resistant material, can be placed on the top side of the at least one stabilizing column 3 and be sealed, preferably by welding, to the metal perimeter, to reduce corrosion on the inner surfaces of the at least one stabilizing column. The at least one stabilizing column 3 need not have a port or the like to allow water to ingress and egress. This is believed to be advantageous because it allows the column 3 to either remain empty or to be filled with other material, such as scrap, construction debris or the like that might otherwise potentially be dumped into the water.

As seen in FIG. 1, one preferred embodiment of the invention has a generally rectangular platform 1, coupled with the at least one stabilizing column 3, sufficiently close to shore to allow for a connection, such as a ramp 8 to be established between the integrated lunar tide electric generator and floating retail structures system and shore, allowing pedestrians, cars, and the like to easily transfer from the shore to the integrated lunar tide electric generator and floating retail structures system. The platform 1 can have a housing 2 attached to a top side of the platform 1, the housing 2 configured to at least partially cover an electrical generating system or a series of reduction gears (not shown). The housing 2 can protect the electrical generating system and series of reduction gears from weather, such as hail and the like, and wildlife, such as birds and the like. In the preferred embodiment, eight housings 2 are covering the 16 stabilizing columns, each housing 2 covering two stabilizing columns and their associated equipment. This reduces construction costs of the housings and also provides a large space including retail structures 17 on the top side of the platform 1, such as shops in a retail arcade 9, usable by pedestrians and the like, and condominiums or other useful commercial, residential or industrial buildings.

Figure 2:
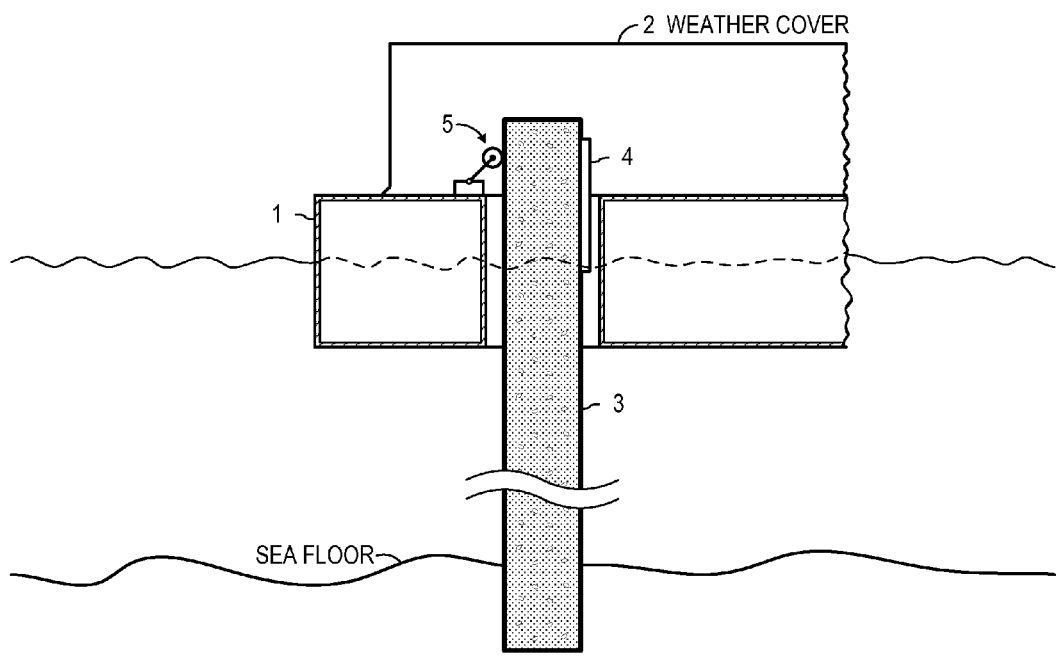
FIG. 2 illustrates a cross-sectional view of the invention as viewed along the 2-2 line.

Referring to FIG. 2, the at least one stabilizing column 3 is coupled to the platform 1. The platform 1 is configured to float at least partially above the water surface and in the preferred embodiment is constructed with a design similar to a large flat-decked ocean-going barge. The interior of the platform can be reinforced, as needed, with metal plates, structural shapes and the like to provide structural integrity for the platform.

In the preferred embodiment shown in FIG. 2, the platform is configured to displace an amount of water equivalent to the weight of the platform, attached structures, expected rain, ice, and snow loads, and any other permanent or semi-permanent forces, including the forces associated with turning the series of reduction gears (not shown), therefore the platform floats at least partially above the water surface. As seen in FIG. 2, the housing can cover the top side of a stabilizing column 3 and roller assembly 5.

In the preferred embodiment partially shown in FIG. 2, a plurality of roller assemblies 5 is attached to the platform around the at least one stabilizing column. In the preferred embodiment, the roller assemblies provide varying horizontal forces towards the at least one stabilizing column 3 to limit horizontal movement of the platform 1 in relation to the at least one stabilizing column 3. In the preferred embodiment, the rack gear 4 is attached to the at least one stabilizing column, therefore the platform will move relative to the rack gear 4 in response to tidal variations. In the preferred embodiment, the rack gear 4 at least has a length as large as the largest tidal variation, allowing a gear to remain in contact with the rack gear during the normal tidal variations.

Figure 3:
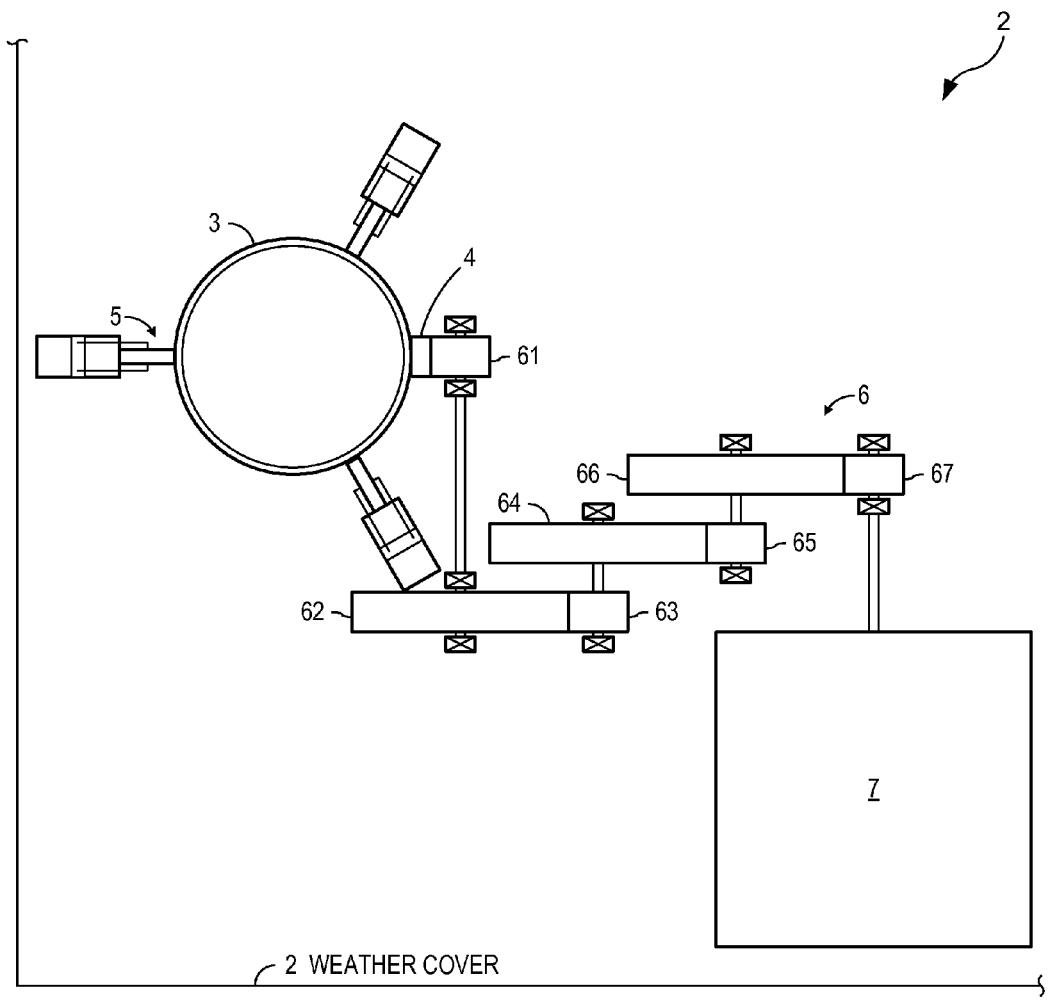
FIG. 3 illustrates a top view of the invention with focus on one stabilizing column.

Referring to FIG. 3, a plurality of roller assemblies 5 is attached to the platform 1 around the at least one stabilizing column 3. In the embodiment shown in FIG. 3, the roller assemblies comprise a spring loaded roller attached to the platform 1. In the preferred embodiment, the electrical generating system 7 is attached to the platform 1 and does not move relative to the platform 1. This fixed position of the electrical generating system 7 relative to the platform 1 is believed to be advantageous. A series of reduction gears 6 can couple the rack gear 4 to the electrical generating system 7. In the embodiment shown in FIG. 3, a gear 61, which is in contact with the rack gear 4, turns as the platform 1 moves vertically in reaction to tidal variations. This turning of the gear 61 in contact with the rack gear 4 initiates the rotation of other gears 62-67 within the series of reduction gears 6. At least one of the gears, such as gear 67, for example, within the series of reduction gears 6 is coupled to the electrical generating system 7, the electrical generating system 7 being configured to convert the rotation of the reduction gears 6 to electrical energy. The number of gears and the gear ratios are dependent on the vertical velocity of each tide and the revolution per minute requirement of each generating system 7, which depend upon local tidal conditions.

The invention can also be applied to generation of electricity from preexisting floating structures, that were originally built for a different purpose other than tidal generation of electricity, such as floating docks, floating marinas and the like, since many such existing floating structures ride up and down on the water surface, guided by one or more stabilizing columns, in the manner previously described for the floating platform 1 and stabilizing column 3. The generation of electricity from such an existing floating structure and stabilizing column, using a rack gear, reduction gears and electrical generating system is the same as previously described. However, where a preexisting floating structure that was originally built for a different purpose is used, only the rack gear, reduction gears and electrical generating system need to be added. Thus, by adapting this equipment to a preexisting floating structure, electricity can be produced from lunar tidal variations at a lower capital cost.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

What is claimed is:

1. An integrated lunar tide electric generator and floating retail structures system comprising:
    at least one stabilizing column having a first end secured to an underwater surface and a second end extending away from a water surface;
    a platform, configured to float at least partially above the water surface, the platform coupled to the at least one stabilizing column, the platform configured to change its position relative to the at least one stabilizing column in response to tidal variations and having retail structures thereon;
    an electric generating system attached to the platform, the electrical generating system configured to convert changes of position of the platform in relation to the at least one stabilizing column to electrical energy; and
    one or more gears attached to the at least one stabilizing column and coupled to the electrical generating system.

2. The integrated lunar tide electric generator and floating retail structures system of claim 1, wherein the platform has a top side configured for constructional development of floating retail structures.

3. The integrated lunar tide electric generator and floating retail structures system of claim 1, wherein the platform has a top side, the platform further comprising a housing attached to the top side of the platform, the housing having a top section configured to at least partially cover the electrical generating system.

4. The integrated lunar tide electric generator and floating retail structures system of claim 1, further comprising a plurality of roller assemblies attached to the platform around the at least one stabilizing column, the roller assemblies configured to contact the at least one stabilizing column, the roller assemblies configured to provide varying horizontal forces towards the at least one stabilizing column to limit horizontal movement of the platform in relation to the at least one stabilizing column.

5. The integrated lunar tide electric generator and floating retail structures system of claim 4, wherein each roller assembly comprises:
    a roller;
    a spring assembly attached to the platform; and
    wherein the roller is attached to the spring assembly.

6. The integrated lunar tide electric generator and floating retail structures system of claim 1, wherein the at least one stabilizing column comprises:
    a metal perimeter configured to contain site excavation debris, wherein the metal perimeter is configured to prevent water from entering through the metal perimeter;
    the second end having a top surface;
    a cap configured to be prevent water and air from entering the area within the metal perimeter, the cap being joined to the top surface of the second end; and
    wherein an inner surface of the perimeter and inner surface of the cap is protected from internal corrosion from exposure to external air and water.

7. The integrated lunar tide electric generator and floating retail structures system of claim 1, wherein the platform is preexisting and originally constructed for a different purpose than tidal generation of electricity.

8. An integrated lunar tide electric generator and floating retail structures system comprising:
    at least one stabilizing column having a first end secured to an underwater surface and a second end extending away from a water surface;
    a rack gear attached to the at least one stabilizing column;
    a platform, configured to float at least partially above the water surface and having retail structures thereon, wherein the platform is coupled to the at least one stabilizing column, the platform configured to change its position relative to the at least one stabilizing column in response to tidal variations;
    an electric generating system attached to the platform;
    a series of reduction gears coupling the rack gear and the electrical generating system; and
    wherein the movement of the platform in response to the tidal variations actuates the series of reduction gears to convert the movement of the platform into electrical energy.

9. The integrated lunar tide electric generator and floating retail structures system of claim 8, further comprising a plurality of roller assemblies attached to the platform around the at least one stabilizing column, the roller assemblies configured to contact the at least one stabilizing column, the roller assemblies configured to provide varying horizontal forces towards the at least one stabilizing column to limit horizontal movement of the platform in relation to the at least one stabilizing column.

10. The integrated lunar tide electric generator and floating retail structures system of claim 9, wherein each roller assembly comprises:
    a roller;
    a spring assembly attached to the platform; and
    wherein the roller is attached to the spring assembly.

11. The integrated lunar tide electric generator and floating retail structures system of claim 8, wherein the platform has a top side configured for constructional development of floating retail structures.

12. The integrated lunar tide electric generator and floating retail structures system of claim 8, wherein the platform has a top side, further comprising a housing attached to the top side of the platform, the housing having a top section at least partially covering the electrical generating system or the series of reduction gears or both.

13. The integrated lunar tide electric generator and floating retail structures system of claim 8, wherein the at least one stabilizing column comprises:
    a metal perimeter configured to contain site excavation debris, wherein the metal perimeter is configured to prevent water from entering through the metal perimeter;
    the second end having a top surface;
    a cap configured to be prevent water and air from entering the area within the metal perimeter, the cap joined to the top surface of the second end; and
    wherein an inner surface of the perimeter and inner surface of the cap is protected from internal corrosion from exposure to external air and water.

* * * * *